Patented Oct. 10, 1950

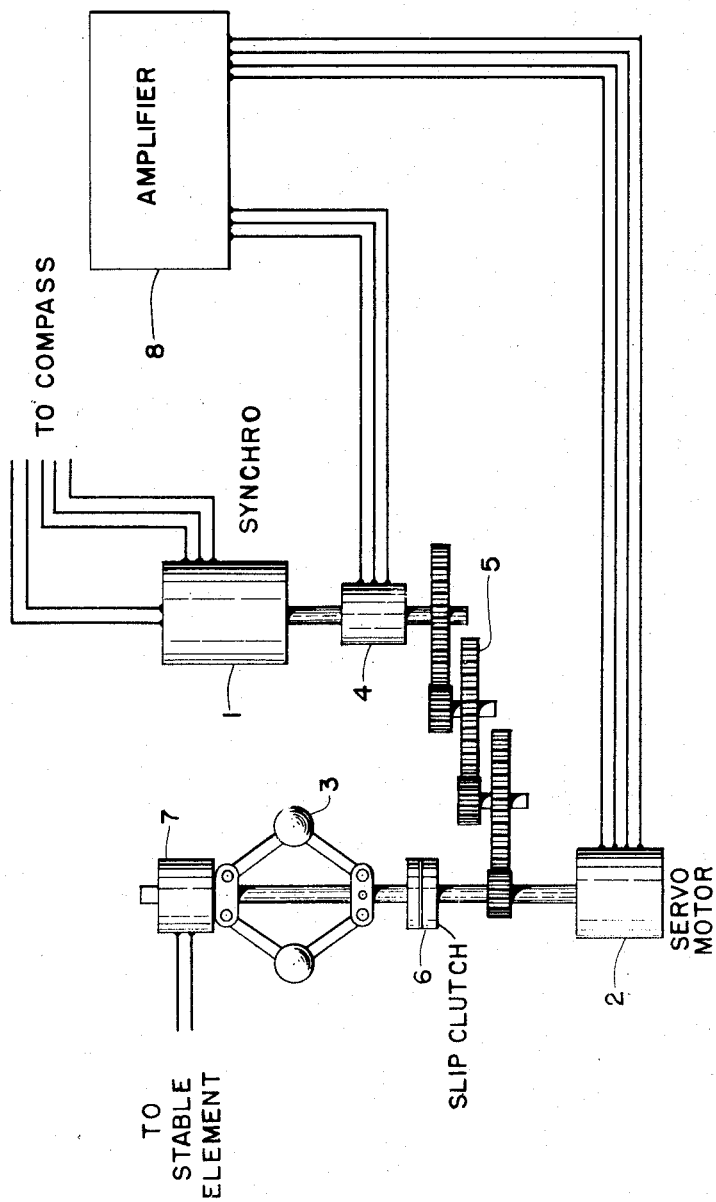

2,525,108

UNITED STATES PATENT OFFICE 2,525,108

ERECTOR MAGNET CUTOUT

Edward R. Wolfert, Springfield, Mass., assignor to the United States of America as represented by the Secretary of the Navy Application November 26, 1945, Serial No. 630,935

4 Claims. (Cl. 175—335)

This invention relates to an erector magnet cut-out for stable elements.

One type of stable element involves the use of a gyro supported in gimbals on mutually perpendicular horizontal axes and spinning on a vertical axis. To provide a force couple for causing precession of the gyro so that it will maintain its spinning axis vertical, use is made of an electromagnet pendulously supported beneath the gyro. The electromagnet induces eddy currents in a semispherical fly wheel mounted on the axle of the gyro. When the effective center of the electromagnet corresponds with the axis of the gyro, eddy currents will be balanced. If, for any reason, the electromagnet is to one side of the center of rotation of the fly wheel, unbalanced eddy currents and accompanying magnetic forces exert a couple tending to precess the gyro back to central position.

When the electromagnet is in a state of rest, it depends vertically downward from its supports and will urge the gyro to maintain its axis vertical. Since precession of the gyro is relatively slow, oscillations of the erecting magnet which are balanced in extent on each side of the vertical will not adversely affect the stability of the gyro. However, when the ship on which the stable element is mounted undergoes movements such as a turn of high rate or over an extended period of time, the magnet will not hang vertical but will coerce the gyro from its true vertical position. In such an event it is desirable to cut off the current to the electromagnet and thus leave the gyro uninfluenced to maintain its position in space by virtue of its inertia. This may, of course, be accomplished manually, but operation will be more satisfactory if this is taken care of automatically by means capable of discerning the proper conditions under which the erector magnet should be de-energized. It is an object of an invention to provide means for de-energizing the erecting magnet when this is advisable to secure optimum operation of the gyro.

A further object is to provide a cut-out system for the erecting magnet of stable elements which may be adjusted so that yaws and turns of short duration or low rate will not be effective to de-energize the erecting magnet but turns of predetermined rate and duration will cause the device to cut off the current from the erector magnet.

A specific object is to provide a system for de-energizing the erector magnet of stable elements by the use of a centrifugal switch operated from the ship's compass system.

The single figure of the drawing is a schematic diagram showing the various parts and their interrelation.

Reference character 1 refers to a synchro motor which is connected electrically with the transmission system of the ship's gyro-compass. By means to be described a follow-up servo-motor 2 is caused to operate a fly ball or similar centrifugal device 3, in accordance with the rate of turn of the ship on which the installation exists. The system for control of the servo-motor comprises the reversing switch shown at 4, the gear train 5 and slip-clutch 6. The centrifugal device 3 effects make and break of the erecting magnet circuit of the stable element by means of switch 7. The amplifier 8 serves to actuate the servo-motor, and may not be needed for certain types of servo systems.

In operation, when the ship departs from its course in a turn, synchro motor 1 will turn in response to signal from the compass and will actuate switch 4 in such fashion as to cause the amplifier 8 to energize the servo-motor for rotation in the proper direction to restore the switch 4 to its null position. In so doing the servo-motor also operates one section of the slip-clutch 6 and through it the centrifugal switch 3—7. When the servo-motor has brought the switch 4 back to null position, it will stop rotating.

The follow-up system comprising switch 4, amplifier 8 and servo 2 may take any of numerous forms, several being presently in use and well-known. The gearing referred to generally at 5 will be designed to secure proper action of the centrifugal switch, which will not necessarily be mounted on the motor shaft as indicated.

Suitably the synchro signal will be at 36-speed, that is, one turn for each 10° of the compass. If the system be adjusted to de-energize the erector magnet at a turn rate equal to one turn in 18 minutes, this will amount to 2 R. P. M. of the synchro 1.

A time delay may be set in by proper correlation between the inertia of the centrifugal switch 3—7 and the friction of the clutch 6 or equivalent. If the rate be set at 1 turn per 18 minutes, then the device may also be adjusted so that the centrifugal switch will not come up to speed for say 3 seconds.

In these adjustments, allowance is made for turns of slow rate and for turns at any rate for short periods such as would not affect the gyro of the stable element. A yaw may be accommodated without effecting cut-out of the erector magnet, since direction of turn may change before the switch 3—7 can act to open the erector magnet circuit.

In any case, when the centrifugal device falls below its set speed, switch 7 closes and the erector magnet assumes its function.

Synchro 1 may, of course, be replaced by a step-by-step or other motor to correspond with the compass transmission system of the ship.

I claim:

1. A device for de-energizing the vertical-axis-maintaining magnets of a gyroscopic member when the member is precessed comprising a compass, means responsive to course alterations by the compass, a reversible switch activated by said responsive means, an amplifier activated by the switch to control a motor, gearing driven by said motor to restore said switch to its off position, a speed responsive device connected to said motor through a time delay means, and a means controlled by said speed responsive device for de-energizing the magnets.

2. A device for de-energizing the vertical axis maintaining magnets of a gyroscopic member when the member is precessed comprising synchro means responsive to compass course alterations, a reversible switch connected to the synchro means, a motor operated by said switch, gearing driven by said motor to restore the switch to its off position, and a speed responsive switch driven by said motor for de-energizing the magnets.

3. A device for de-energizing the vertical axis maintaining magnets of a gyroscopic member when the member is precessed comprising synchro means responsive to compass alterations, a reversible switch connected to the synchro, a motor operated by said switch, means driven by said motor acting to operate said switch in a direction opposite to that caused by the synchro, speed responsive means driven by said motor, and magnet de-energizing means operated by the speed responsive means if the motor speed exceeds a predetermined value.

4. A device for de-energizing the vertical axis maintaining magnets of a gyroscopic member when the member is precessed comprising means responsive to compass alterations, a reversible switch activated by said responsive means, an amplifier activated by the switch to control a motor, gearing driven by said motor to restore said switch to its off position, a time delay device rotated by the motor, a centrifugal speed responsive device connected to and rotated with the time delay device, and magnet de-energizing means operated by the centrifugal speed responsive device should the precession be such as to operate the centrifugal device beyond a predetermined point.

EDWARD R. WOLFERT.

REFERENCES CITED

The following references are of record in the file of this patent:

UNITED STATES PATENTS

| Number | Name | Date |
| --- | --- | --- |
| 1,395,294 | Pierce | Nov. 1, 1921 |
| 1,684,132 | Hewlett | Sept. 11, 1928 |
| 2,390,084 | Edwards | Dec. 4, 1945 |
| 2,399,685 | McCoy | May 7, 1946 |